(12) United States Patent
Franklin et al.

(10) Patent No.: US 7,815,506 B2
(45) Date of Patent: Oct. 19, 2010

(54) PLAYER REWARD SYSTEM FOR ACTIVITY ON A COMPUTER SYSTEM

(75) Inventors: Jeff Franklin, Monrovia, CA (US); Ruben M. Pegorer, Beverly Hills, CA (US); Jeffrey R. Horowitz, Sherman Oaks, CA (US)

(73) Assignee: Youbet.COM, Inc., Woodland Hills, CA (US)

( * ) Notice: Subject to any disclaimer, the term of this patent is extended or adjusted under 35 U.S.C. 154(b) by 538 days.

(21) Appl. No.: 11/684,295

(22) Filed: Mar. 9, 2007

(65) Prior Publication Data
US 2007/0281790 A1    Dec. 6, 2007

Related U.S. Application Data

(60) Provisional application No. 60/803,921, filed on Jun. 5, 2006.

(51) Int. Cl.
*A63F 9/24* (2006.01)
*G06Q 30/00* (2006.01)

(52) U.S. Cl. .............. 463/25; 463/29; 463/42; 705/10; 705/14.27; 340/323 R

(58) Field of Classification Search .............. None
See application file for complete search history.

(56) References Cited

U.S. PATENT DOCUMENTS

| | | | | |
|---|---|---|---|---|
| 3,697,698 A | * | 10/1972 | Oswald et al. | 370/242 |
| 3,810,627 A | * | 5/1974 | Levy | 463/26 |
| 5,129,652 A | * | 7/1992 | Wilkinson | 273/139 |
| 5,320,351 A | * | 6/1994 | Suzuki | 463/6 |
| 5,429,361 A | * | 7/1995 | Raven et al. | 463/25 |
| 5,761,647 A | * | 6/1998 | Boushy | 705/10 |
| 5,770,533 A | * | 6/1998 | Franchi | 463/42 |
| 5,816,918 A | * | 10/1998 | Kelly et al. | 463/16 |
| 5,830,068 A | * | 11/1998 | Brenner et al. | 463/42 |
| 6,371,852 B1 | * | 4/2002 | Acres | 463/25 |

\* cited by examiner

*Primary Examiner*—M. Sager
(74) *Attorney, Agent, or Firm*—Howard & Howard Attorneys PLLC

(57) ABSTRACT

A system and method for rewarding a player for activity through a computer system relating to a racetrack track event. The computer system is operatively connected with a remote device to display a player interface to transmit and receive information and requests from the player. The request may be for various player activity through the computer system, including wagers, purchases for products or services, and various other activities relating to wagering on a racetrack event. The computer system tracks the player activity and determines an award amount for the player activity. The award amount is dependent on the reward level of the player as determined by a set of predetermined criteria inputted into the computer system. The player can accumulate the award amount in an award total or redeem the award total for prizes, products, services or a cash value.

17 Claims, 3 Drawing Sheets

| TYPE | DTS | POINTS EARNED | REDEEMED | EXPIRED | BALANCE |
|---|---|---|---|---|---|
| FUNDING | JUNE 20, 2005 | 100 | - | 0 | 0 |
| WAGERS | JUNE 21, 2005 | 250 | - | 0 | 0 |
| WAGERS | JUNE 22, 2005 | 150 | - | 0 | 0 |
| SUB PLAN RENEWAL | JUNE 30, 2005 | 100 | - | 0 | 0 |
| REDEMPTION | JULY 1, 2005 | - | 400 | - | - |
| WAGERS | JULY 10, 2005 | 300 | - | 0 | 100 |
| REDEMPTION | JULY 10, 2005 | - | 400 | - | - |
| PRODUCT PURCHASE | JULY 10, 2005 | 50 | - | 0 | 50 |
| TOAL | | 950 | 800 | 0 | 150 |

FIG. 3

Base Point Value Management

Business Relationships: YB - USA

| Source Market | Track Contact | WPS Value | Exotics Value | Start | End | Created | Created By | |
|---|---|---|---|---|---|---|---|---|
| california | independent | 1 | 2 | 3/14/2006 | | 3/13/2006 | NAJam | Edit |
| california | magna | 2 | 3 | 2/3/2006 | | 2/2/2006 | NAJam | Edit |
| california | tvg | 3 | 4 | 3/1/2006 | | 2/28/2006 | NAJam | Edit |
| california | tvg non-exclusive | 4 | 5 | 1/5/2006 | | 1/4/2006 | Paul Phung | Edit |
| deleware | independent | 12 | 21 | 10/5/2006 | | 10/4/2006 | Ruben Pegoter | Edit |
| deleware | magna | 4 | 8 | 10/5/2006 | | 10/4/2006 | Ruben Pegoter | Edit |
| deleware | tvg | 0 | 0 | 10/5/2006 | | 10/4/2006 | Ruben Pegoter | Edit |
| deleware | tvg non-exclusive | 5 | 10 | 10/5/2006 | | 10/4/2006 | Ruben Pegoter | Edit |
| idaho | Independent | 5 | 6 | 2/3/2006 | | 2/2/2006 | NAJam | Edit |
| idaho | magna | 6 | 7 | 10/17/2005 | | 1/4/2006 | Paul Phung | Edit |
| idaho | tvg | 7 | 8 | 2/3/2006 | | 2/2/2006 | NAJam | Edit |
| idaho | tvg non-exclusive | 8 | 9 | 3/14/2006 | | 3/13/2006 | NAJam | Edit |
| magna | independent | 9 | 10 | 3/1/2006 | | 2/28/2006 | NAJam | Edit |
| magna | magna | 10 | 11 | 10/17/2005 | | 1/4/2006 | Paul Phung | Edit |
| magna | tvg | 11 | 12 | 10/17/2005 | | 1/4/2006 | Paul Phung | Edit |
| magna | tvg non-exclusive | 12 | 13 | 10/17/2005 | | 1/4/2006 | Paul Phung | Edit |
| massachusetts | independent | 13 | 14 | 10/17/2005 | | 1/4/2006 | Paul Phung | Edit |
| massachusetts | magna | 14 | 15 | 10/17/2005 | | 1/4/2006 | Paul Phung | Edit |
| massachusetts | tvg | 15 | 16 | 10/17/2005 | | 1/4/2006 | Paul Phung | Edit |
| massachusetts | tvg non-exclusive | 16 | 17 | 10/17/2005 | | 1/4/2006 | Paul Phung | Edit |
| none | independent | 17 | 18 | 3/21/2006 | | 3/20/2006 | Paul Phung | Edit |
| none | magna | 18 | 19 | 2/3/2006 | | 2/2/2006 | NAJam | Edit |
| none | tvg | 19 | 20 | 3/18/2006 | | 3/18/2006 | NAJam | Edit |
| none | tvg non-exclusive | 20 | 21 | 3/18/2006 | | 3/18/2006 | NAJam | Edit |

FIG. 4

PLAYER REWARD SYSTEM FOR ACTIVITY ON A COMPUTER SYSTEM

CROSS REFERENCE TO RELATED APPLICATION

This application claims the benefit of U.S. Provisional Application No. 60/803,921, filed Jun. 5, 2006, which is hereby incorporated by reference.

FIELD OF THE INVENTION

A method for rewarding a player for player activity related to a racetrack event or venue on a remote device in communication with a computer system.

BACKGROUND OF THE INVENTION

Various player tracking systems are used in casinos and gaming facilities to track a player's wagering activity within a gaming facility. The player tracking systems offer a player additional rewards for signing up to create an account and using identification systems throughout the gaming facility for recording the player's activity. The gaming facilities reward the player based on recorded wagering activity and purchases at the gaming facility. These rewards could include a wide array of prizes and compensations including hotel rooms, meals, show tickets and a cash value toward additional purchases and additional wagers at the gambling facility.

Generally, player tracking systems have not been used to track a player placing wagers online, e.g. on-line wagers on horse races. There has been an increased development of internet web-based gaming sites and companies. The web-based gaming companies are often not affiliated with a traditional casino or gambling facility for various reasons to offer rewards for player activity. The web-based gaming sites are competing with various promotions to entice and draw players to use their web-based gaming site. Therefore, there exists a need for a unique reward program that tracks a player and offers the player various rewards depending on the player's activity through a computer system.

The present invention is directed at solving the problem presented above.

SUMMARY OF THE INVENTION

One aspect of the invention includes a method for rewarding a player for activity related to a racetrack event through a computer system. The method includes the step of creating a player account for the player. The player account includes an award total, a player identification and a reward level. The method further includes the steps of displaying a player interface for the player on a remote device connected to the computer system and identifying the player at the remote device. The method further includes the steps of placing a wager on the racetrack event from a request by the player on the remote device and storing the wager information on the computer system. The wager information includes the wager and past wagers. The method further includes the steps of determining an award amount as a function of the wager, the reward level, and a set of predetermined criteria and adding the award amount to the award total in the player account.

A second aspect of the invention includes a system for rewarding a player for activity related to a racetrack event through a computer system. The computer system comprises a remote device for displaying a player interface to the player. The computer system is operatively connected to the remote device. The computer system creates a player account for the player. The player account includes an award total, a player identification and a reward level. The computer system identifies the player at the remote device and allows the player to place a wager on the racetrack event. The computer system stores wager information. The wager information includes the wager and past wagers. The computer system determines an award amount as a function of the wager, the reward level and a set of predetermined criteria. The computer system adds the award amount to the award total in the player account.

A third aspect of the invention is a method for rewarding a player for activity related to a racetrack event through a computer system. The method includes the step of creating a player account for the player. The player account includes an award total, a player identification and a reward level. The method further includes the steps of displaying a player interface for the player on a remote device connected to the computer system and identifying the player at the remote device. The method further includes the steps of placing a wager on the racetrack event on a request by the player at the remote device and storing in the player account player activity by the player on the remote device. The player activity includes the wager, past wagers, usage amount on the remote device and products or services purchased. The method further includes the steps of determining an award amount as a function of the player activity, the reward level, and a set of predetermined criteria and adding the award amount to the award total in the player account. The method further includes the steps of redeeming all or a portion of the award total in the player account for a product, a cash value or a service on a request by the player at the remote device, and managing the player account by expiring the award amount after a set duration.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a balance sheet of the daily award amounts and award total in a player account;

FIG. 4 a first screen of a server interface for inputting a set of predetermined criteria to determine a base reward level;

DETAILED DESCRIPTION OF THE INVENTION

Referring to the Figures, wherein like numeral indicate like parts throughout the several views, a computer system 20 rewards a player for activity through a remote device 26. The computer system 20 is operatively connected with the remote device 26. The player 30 on the remote device 26 can conduct transactions and requests through the computer system 20. The transactions include wagers, purchases for products or services, and various other activities relating to wagering on a racetrack event 28. The computer system 20 tracks the player's transaction on the remote device 26 and determines an award amount for the player activity on the remote device 26. The player 30 can accumulate the award amount in an award total. The player 30 can also redeem the award total for prizes, products, services or a cash value.

Figure 1:
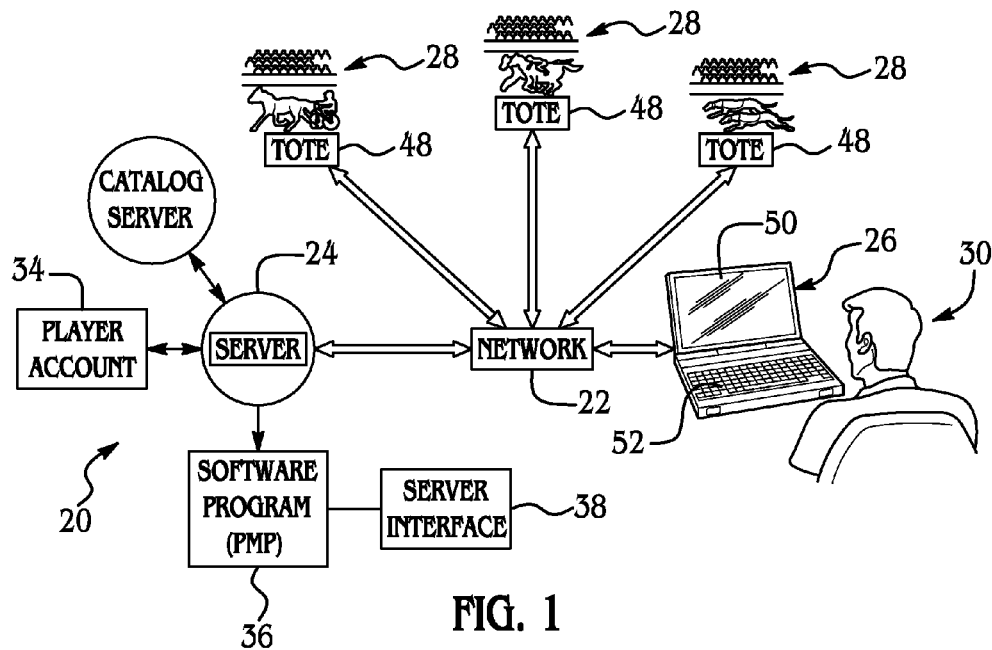
FIG. 1 is a schematic view of a computer system for rewarding a player for activity on a remote device according to an embodiment of the present invention.

Now looking at FIG. 1 the illustrated embodiment includes a computer system generally shown at 20. The computer system 20 includes at least one server shown at 24. The computer system 20 has a communication network 22 for operatively connecting the server 24, the remote device 26 and a racetrack event 28. It should be understood that the computer system 20 may include a single server 24 located at a central location or may include multiple servers 24 located at several different locations. One similar system is disclosed in a pending commonly assigned U.S. patent application Ser. No. 10/940,865 filed on Sep. 14, 2004, which is hereby incorporated by reference.

The computer system 20 tracks the player activity on the remote device 26. The remote device 26 allows the player 30 to request transactions through the computer system 20. The computer system 20 offers the player 30 an incentive or an award amount for certain player activity on the remote device 26. The player activity may include wagers, purchases, and various other activities. The award amount is determined by the computer system 20 based on a set of predetermined criteria 32 programmed into the computer system 20 as will be further discussed below.

The computer system 20 creates a player account 34 on the server 24 for each player 30. The player account 34 is stored on the computer system 20. The player account 34 includes an award total, a player identification and a reward level. The award total is the accumulated award amounts, for example the award total is the balance of award amounts available for redemption by the player 30. The player identification is information to identify the player 30 at the remote device 26 to the computer system 20, i.e., log-on information. The reward level may be a tiered reward for the player 30 based on the player activity or certain promotion as determined in the set of predetermined criteria 32.

The player account 34 can be stored on the computer system 20 and in communication with the server 24 for access by the computer system 20. The computer system 20 and/or the server 24 may access the player account 34 to continuously update the player account 34 with recent requests, transactions, award amounts and award total. The player account 34 can be stored on the computer system 20 as a database. The database could be in various computer languages as is known in the art, including Structured Query Language (SQL).

The computer system 20 and the server 24 determine the award amount in a tiered reward program by a program operable on the computer system 20, a player point management program (PMP). The PMP is generally shown at 36 in FIG. 1. In the illustrated embodiment, the PMP 36 is a software program operable on the computer system 20 to determine the reward level, award amount, wager information and manages the player accounts 34 on the computer system 20. The PMP 36 includes a server interface 38 for a user or a system administrator to customize the computer system 20. The PMP 36 through the server interface 38 is programmed with the set of predetermined criteria 32 used by the PMP 36 to determine the award amount, reward level and manage the player account 34. The server interface 38 in the illustrated embodiment is in an Extensible Markup Language (XML) and various other programming languages could be used as the server interface 38 as known in the art.

The reward level for the player 30 may further be defined as a base reward level and a usage reward level. The reward level is determined based on the set of predetermined criteria 32 inputted into the server interface 38.

The base reward level is determined by the set of predetermined criteria 32 inputted into a first screen 40, a base point value, as shown in FIG. 4. The racetrack and racetrack event 28 inputted with the first screen 40 may include specific information on a market base for each player 30 and location of the racetrack event 28. The base point value may further include criteria related to a racetrack contract or network association for each racetrack event 28, i.e. a Tvg Network, a Tvg Network non-exclusive, or an independent racetrack. Also the base point value may capture a wager category for each racetrack event 28. The base reward level is generally pre-determined for each racetrack event 28 and is relatively constant for each racetrack event 28 at the same venue.

Figure 5:
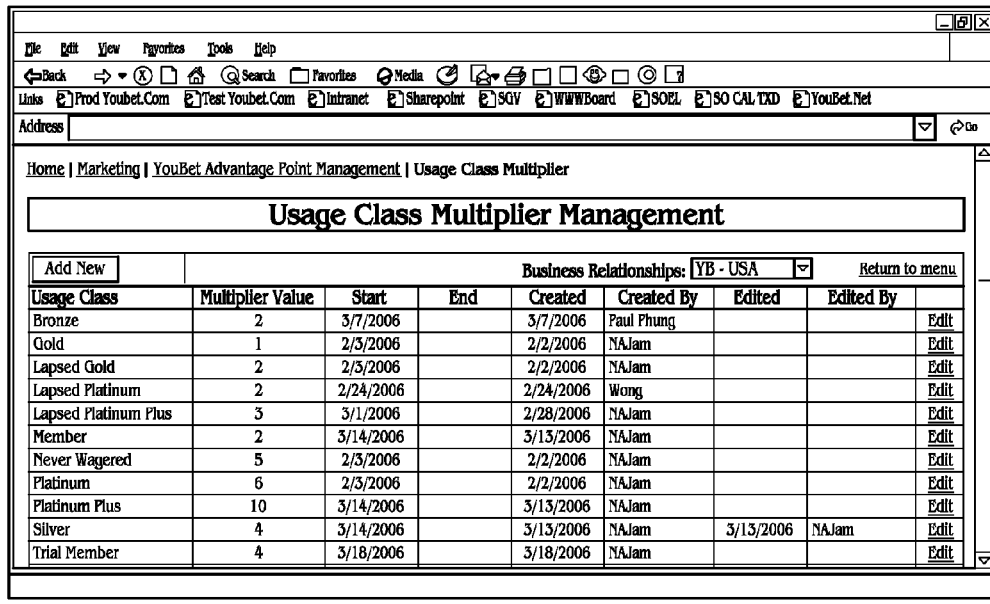
FIG. 5 a second screen of the server interface for inputting the set of predetermined criteria to determine a usage reward level.

The usage reward level may further be defined by a player usage level and modifier rules. The usage reward level is determined by the PMP 36 comparing the player activity to the set of predetermined criteria 32. Referring to FIG. 5, the set of predetermined criteria 32 in the illustrated embodiment is inputted into a second screen 42 of the server interface 38. The PMP 36 may utilize the additional criteria to determine the player 30 usage level. The player usage level is usually a scalar multiplier of the base reward level. The player usage level increases as the player activity increases to reach a threshold or satisfies the set of predetermined criteria 32 the PMP 36 increases the scalar value of the player usage level. The player usage level may be used to entice a player 30 to place additional requests and player activity through the remote device 26.

Figure 6:
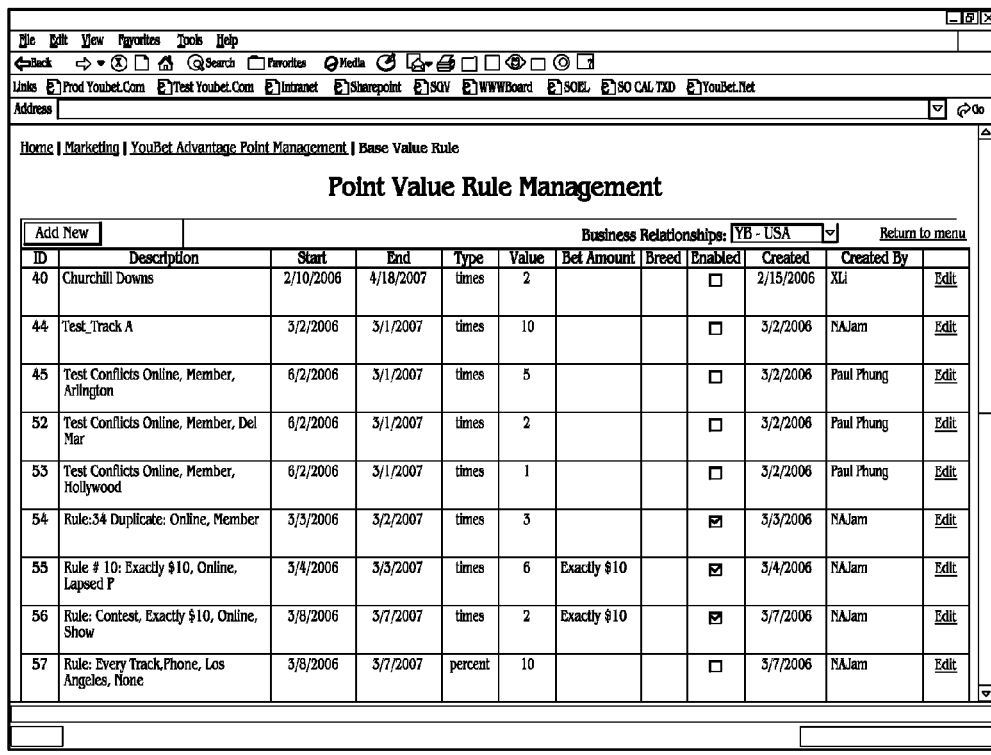
FIG. 6 a third sample screen of the server interface for inputting the set of predetermined criteria to determine rule modifiers.

The modifier rules can be an additional scalar number added to the player usage level or a set value added to the award amount. The modifier rules in the illustrated embodiment are inputted into the PMP 36 through a third screen 44 of the server interface 38 as shown in FIG. 6. The modifier rules allow a user or system administrator to customize the PMP 36 and can be used to promote various racetrack events 28, wagers, and/or based on numerous variables such including time, wager category, location of the player 30 or racetrack event 28, etc.

It would be understood to one skilled in the art that the usage reward level could result in various award amounts depending on the player 30 for a given transaction, wager request or other player activity recorded in the player account 34. The reward level may be determined as a function of the base reward level and the usage reward level. If the usage reward level is a scalar multiplier the reward level would equal the base reward level multiplied by the usage reward level. The usage reward may also include a set amount or value that would be added to the award amount after the transaction or request by the player 30 is made that satisfies the predetermined criteria 32. It is further contemplated that the usage reward level could be both a scalar multiplier of the base reward level and an additional award amount.

Referring to FIG. 1, the computer system 20 is operatively connected to a catalog server 46. The catalog server 46 updates the computer system 20 with new products, services and cash values for the award total in the player account 34. The update from the catalog server 46 could be done daily, monthly or at any given set duration as triggered by the computer system 20 or as inputted through the PMP 36 by a user through the server interface 38. The catalog server 46 is usually a contracted service outside the racetrack, or the online gambling provider. Generally, the catalog server 46 is a promotions company, such as a contracted service as provided by Cascade Promotion Corporation.

The computer system 20 may be connected to the racetrack event 28. The racetrack event 28 can be located anywhere in the world. The computer system 20 can further be connected to a variety of racetrack events 28 in various locations. The computer system 20 would be updated by the racetrack event 28 with the entrants in the race, in some cases may provide streaming video or audio feed from the racetrack event 28. The computer system 20 may further be operatively connected to at least one wager totalizer betting system, known as a tote 48, located at each of the racetrack events 28 or associated with a network 22 of racetracks depending on the tote 48 and the various racetrack contracts. It should be understood that for some events the tote 48 is not necessarily required. The tote 48 is commonly used by racetrack events 28 to track the amount of money wagered on each entrant in each pending event occurring at the racetrack event 28. The computer system 20 may need to communicate with a tote 48 to place a wager at the racetrack event 28 and receive wagering information from the racetrack event 28.

The remote device 26 is operatively connected to the computer system 20 through the network 22 for transmitting and receiving the player activity into the computer system 20. The remote device 26 displays a player interface 50 for the player 30 to submit requests for various operations and functions. The various functions may include but are not limited to placing a request for a wager, a request to redeem award totals, a request for a report and purchases of products or deposits into the player account 34. The player interface 50 may include additional options and player activity such as cancellation of a pending wager. An example of such a system for cancellation of a pending wager is found in a pending commonly assigned U.S. patent application Ser. No. 11/279, 834, filed on Apr. 14, 2006, which is hereby incorporated by reference.

The remote device 26 transmits a data from the computer system 20 to the player interface 50. The remote device 26 could use a display or audio device to transmit information and the player interface 50 to the player. The remote device 26 further incorporates an input device 52. The input devices 52 as are known to those skilled in the art include for example a keypad, touch screen, keyboard, voice recognition or other variations. The player interface 50 allows the player to enter a request through the remote device 26 into the computer system 20. The input device 52 receives the player's interaction and transmits to the computer system 20 through the remote device 26 any request or player activity. The remote device 26 may be implemented as a computer terminal, a personal computer, a notebook computer or a digital personal assistant, a telephone or other suitable devices 26, 52 as known in the art.

The communication network is generally shown at 22 in the illustrated embodiment and is used to transmit data between the tote 48, the computer system 20 and the remote device 26 by a hard wire connection, a wireless connection or a combination of a hard wire and a wireless connection. Examples of hard wired connections include but are not limited to telephone service, fiber optic communications, Ethernet and/or the internet. Examples of wireless communications include but are not limited to cellular telephone networks, personal communication systems (PCS networks, Wi-Fi networks (WLAN) or Bluetooth.

Figure 2:
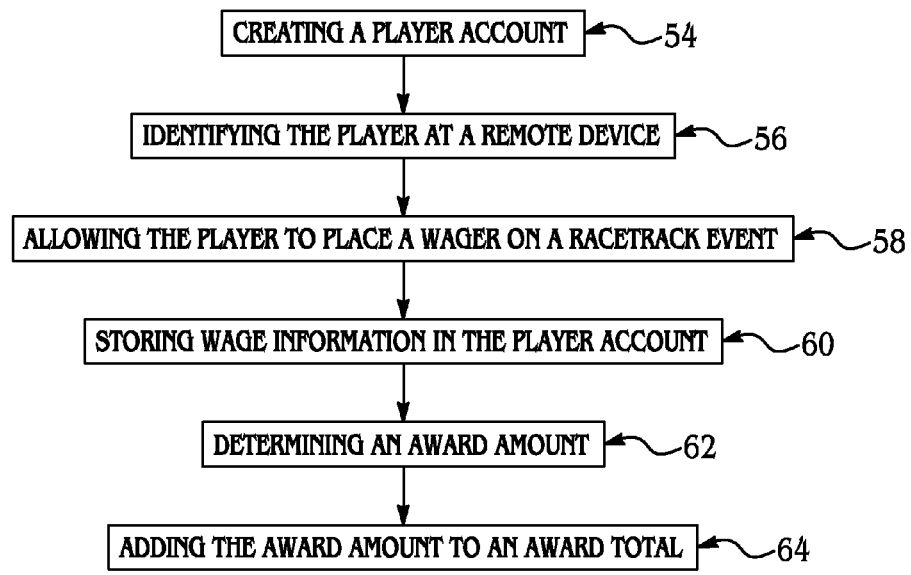
FIG. 2 is a block diagram of a method of awarding a player for placing a wager on the computer system.

Referring to FIG. 2, the computer system 20 in the illustrated embodiment allows the player 30 at a remote location to place wagers on racetrack events 28. The computer system 20 additionally rewards the player 30 for player activity and requests placed by the player 30 on the remote device 26. The computer system 20 in a first step 54 creates a player account 34. As discussed above the computer system 20 through the remote device 26 must determine the player identification, the reward level and the award total. For a new account, the computer system 20 on the request by the player 30 on the remote device 26 stores the player identification in the player account 34. The player account 34 is accessible to the computer system 20. The computer system 20 or the server 24 may update the award total and the reward level as the player 30 makes requests on the remote device 26 and player activity is logged or stored into the player account 34, as previously described above.

Before the computer system 20 allows the player 30 to send requests through the computer system 20 the player 30 on the remote device 26 must be identified. As shown in a second step 56 in the illustrated embodiment the computer system 20 identifies the player 30 at the remote device 26. The computer system 20 may identify the player 30 by comparing the player's input on the remote device 26 with the player identification stored in the player account 34. This may include a log-on identification or an ID name, and a password and may additionally include additional security questions, as are known in the art. The player identification may further include various methods as are well known in the art of online stores and web-based systems to identify a player 30 or purchaser to prevent fraudulent activity through the computer system 20.

A third step 58 in the illustrated embodiment of the computer system 20 allows a player 30 to request a wager on the racetrack event 28 through the player interface 50 on the remote device 26. The request is processed by the computer system 20 and the computer system 20 stores the wager information in the player account 34 placing the wager on the computer system 20. Optionally, the computer system 20 may need to further communicate the wager request with the tote 48 located at or associated with the racetrack event 28 over the communication network 22, as previously explained.

The computer system 20 stores the requested wager and the past wagers as the wager information in the player account 34, as denoted in a fourth step 60 of the illustrated embodiment. The computer system 20 and the PMP 36 utilize the wager amount, the wager information, and player activity to determine an award amount as a function of the reward level of the player 30.

The computer system 20 determines the award amount generally indicated by a fifth step 62. The award amount is determined as a function of the reward level for the player 30 and the wager amount or the player activity. The award amount is usually a percentage of the dollar amount of the wager or the player activity. Additional award amounts can be used to entice and promote various activities through the computer system 20.

In determining the award amount, the computer system 20 and the PMP 36 may also determine the reward level for the player 30. The reward level includes a base reward level and a usage reward level. The base reward level is determined as a function of the racetrack event 28. The function is calculated from the set of predetermined criteria 32 inputted in the first screen 40 as shown in FIG. 4. As previously discussed, the base reward level is a function that may include the source market for each racetrack or player 30, the contract classification for each racetrack and the wager category for each racetrack event 28.

The computer system 20 and the PMP 36 determine the usage reward level as already discussed. The PMP 36 combines the base reward level and the usage reward level to determine the reward level for each player 30. The reward level is generally determined at the time the player 30 logs into the remote device 26 and is identified by the computer system 20. The reward level for the player 30 could alternatively be determined daily, weekly, monthly or averaged over a period of time depending on the player activity stored on the computer system 20 during a specific period of time.

The award amount is determined from the reward level for each player 30. Optionally, the award amount could be displayed on the remote device 26 prior to the player 30 sending or making the request on the remote device 26. The display of the potential award amount may be used to promote additional player activity or increased wager amounts. In a sixth step 64, the computer system 20 adds the award amount to the award total and updates the award total in the player account 34.

Additional functions of the computer system 20 and the PMP 36 may include managing the award total and the player account 34. The PMP 36 manages the player accounts 34 first by updating the award totals by subtracting out the points redeemed and adding the additional award amounts. The update to the player account 34 could be simultaneous, allowing the player 30 immediate access to the award total in the player account 34. However, this can add additional risks of the player 30 redeeming the award total and then canceling the wager or returning the purchase. To avoid such a risk of an early redemption, the award total can be updated at an interval determined by the administrator or user, such as daily computations. An example of a daily balance sheet is shown in FIG. 3. The balance sheet would need to sum the award amounts subtract the redeemed award amounts and the expired award amounts from the award amounts and the remaining is the award total in the player account 34.

The computer system 20 may log or record each award amount with a time and day stamp in the player account 34. The time and day stamp can be used for various purposes. One purpose is the PMP 36 expires the award amount after a set duration of time. The set duration of time may be for example a year from the time the award amount is added to the award total in the player account 34. However, the set duration of time can be customized by the user through the server interface 38.

The PMP 36 may also uses the time and day stamp to generate an audit trail upon a request from the player 30 at a remote device 26 or from a request by a user on the server interface 38. The audit trail is a report that includes a summary of all of the award amounts, the expired award amounts and the redeemed award amounts of the award total for the player account 34. The audit trail can be customized for a specified period of time by the player 30 or the user.

The computer system 20 and the PMP 36 may also allow the player 30 to request to redeem all or a portion of the award total in the player account 34. The player 30 on the remote device 26 can request to redeem the award total. The computer system 20 could display the products available from the catalog server 46 on the player interface 50 along with the award total needed for each of the available products or services. The award total redeemed by the request of the player 30 is subtracted from the award total in the player account 34 as discussed above by the PMP 36 and the computer system 20. If the player 30 chooses the cash value, the cash value is usually restricted to use as additional wagers or purchases of products provided by the online gaming provider or an affiliated racetrack.

INDUSTRIAL APPLICABILITY

In one embodiment(described below), the subject invention is a reward system for player activity on a computer system 20. The computer system 20 rewards a player 30 for player activity through a remote device 26 on a racetrack event 28. More specifically, the player wagers on the racetrack event 28 through the computer system 20 operatively connected to an on-line or player interface 50 on the remote device 26. The reward or award amount may be earned from a wager, product purchases, funding, deposits or any player activity on the remote device 26 through a computer system 20.

Glossary:

BPV—Base Point Value—A point value associated to a dollar wagered based upon source market, track contract category and wager category;

BPVM—Base Point-Value Matrix—A 3-dimenisonal matrix of BPVs indexed by customer source market, track contract category and wager category;

MR—Modifier Rule—short-form of a UCPVMR;

PMP—Player Management Program;

PPV—Player Point Value—A usage class point value modified by UCVMRs that is associated to a dollar wagered for a player;

UCM—Usage-Class Multiplier—A scalar value assigned to a usage class that creates a UCPV when multiplied with a BPV;

UCPV—Usage-Class Point Value;

UCPVM—Usage-Class Point Value Matrix—A 2-dimensional matrix of UCPVs row-indexed by track contract category and column-indexed by wager category; and UCVMR—Usage-Class Point-Value Modifier Rule—A logical expression that tells how to modify a UCPV.

The computer system 20 allows points or award amounts to be accumulated according to several criterions: the player's source market, track's contract classification, wager category, usage class and special rules. These mechanisms and process order are described here, to define a base reward level and a usage reward level. The inputs of the mechanisms or set of predetermine criteria for determining the award amount or points are provided through an intranet interface or a server interface 38.

A point model is an aspect of the computer system 20 where the award amounts or points are determined by the wager placed by the player 30 through the remote device 26. In this section we first describe a wager point-value model. This is the model that determines how many points or award amount a player 30 may earn on a wager. Award amounts, or points, may also be earned through non-wagering means as inputted through the predetermined criteria 32.

The wager point-value model includes three tiers of the wager point-value model: base point value, usage-class point value and player point value. The base point values and matrix determine a base point value (BPV) that is the least amount of points or award amounts earned per dollar wagered. A BPV is the base reward level for the player 30 and may depend upon three criterions for each racetrack event 28. First is the geographical or source market. The geographical location may include for both the player 30 and the racetrack event 28. The second criterion is a racetrack contract classification of the racetrack event 28 i.e., a Tvg, a Tvg non-exclusive, a magna, or an independent. The third criterion is the wager category, rather a win, place or show wager or a more exotic wager such as trifecta.

The BPV is defined through financial analysis and rarely change. The BPV is organized into a 3-dimensional matrix called the base point-value matrix (BPVM). The BVPM is used to determine the base reward level for each racetrack event 28. Referring to FIG. 4 a first screen 40 of the server interface 38 illustrates the 3-dimensional or three variables used to determine the base reward level. The BPVM is made available to the player management program (PMP) and the PMP is operable on the computer system 20. The server interface 38 is in XML form. The XML document is published onto whatever servers 24 that needs the BPVM on a nightly basis via the typical Message Junction data publishing process. A SQL interface rather than XML can also be considered if necessary. This may be more useful for back-end wager processing. And, since the data can be cached on the computer system 20 and server 24 (in XML form), this may not be too large an Input/Output burden as the BPVM is small and access would be infrequent.

The player usage reward level may include a usage-class multipliers and usage class point value matrix captured in the predetermined set of criteria. The elements of the BPVM and the reward level for a player 30 may change according to the player's usage class, or player usage reward level. Each usage class is assigned a scalar value called the usage-class multiplier (UCM), as shown in a second screen 42 in FIG. 5. The UCM is applied to the BPVM subset relevant to the customer's source market results in a usage-class point-value matrix (UCPVM). A customer's UCPVM may be obtained at login through a remote device 26 having a player interface 50. The UCPVM is indexed by racetrack contract category and wager category.

The 2-dimensional UCPVM is used as the foundation of the display for the player 30 on the player interface 50. When the player 30 logs into the computer system 20 through the remote device 26 the UCPVM will be mapped to the racetrack events 28 that are on that calendar day.

The usage reward level additionally includes a usage-class point-value modifier rules or a modifier rules as captured in the set of predetermined criteria 32 inputted into the server interface 38. The usage class point value can be modified one last time by one or more usage-class point-value modifier rules (UCPVMR). A UCPVMR may often be referred more simply as a modifier rule (MR), and is a tiered reward under the usage reward level. In one example, a MR may double points on exotic wagers at all harness racetrack on a particular day. A MR may affect zero or more usage class point values for a customer. The effect is applied when a wager request is created and ready to submit, except in the case that the modifier rule applies to a contest wager. In this later case, the modifier rule is applied in comparison to a non-contest wager on the wager confirmation screen of the player interface 50. The modifier rule syntax is similar to the syntax of contests and made available to applications in an XML document on the server interface 38, as shown a third screen 44 in FIG. 6.

A customer may also earn points or award amount by other activity through the computer system 20. The other activity may include purchases of information products and premium services, and may also include things like deposits. The point-values for these needs to be able to be switched on and off and itemized. For example, a special on deposits for a particular week or day is a viable condition.

Maintenance of BPV, UCM, MR and other point values may be provided via an intranet application in the marketing section of the intranet, or the server interface 38. The server interface 38 may have a screen that allows entry of BPV in matrix form, as shown in FIG. 4. Additionally, the server interface 38 may have a screen that allow for the entry of UCM or MR, as shown in FIGS. 5 and 6 respectively. In addition, the server interface 38 can further include a screen to allow entry of other point-values for special events or promotions to entice additional player activity on the remote device 26.

Each screen on the server interface 38 stores the updates in the main SQL server 24 database. The updates typically do not become effective until the next racing day. This means that each of these elements have an active and pending value. A pending value becomes active with a nightly job or update. However, the updates are not limited to updating the next racing day and may be updated at any other time as specified or required. Additionally, the pending value is not limited becoming active with a nightly job, but may become active instantaneously, by running a job at any other desired time, or through any other desired method of activating the pending value.

Once this update completes, XML documents are propagated through the computer system 20 and servers 24 as necessary.

Point management aspect of the computer system 20 and PMP 36 is the process of maintaining the point balance or award total available in the player account 34 for the player 30. To facilitate the point management, each player 30 will have a player account 34 that contains a points account or an award total. The specifics of this account are left to detailed design; however, the basic operations on this account will be adding points, subtracting points, expiring points, get points or update an award total, and reporting for an audit trail.

When an "add points" or award amount transaction occurs, an audit trail record will be created for the transaction. This record will include information about the transaction (e.g., type and maybe link), the number of points the transaction added or the award amount, the time stamp of the transaction and the expiration date of the points or award amount earned by the transaction. This record will also contain the number of points or award amounts that have been redeemed and the number of points or award amounts that have expired. Initially these two fields are set to zero. This record could also have the number of points left or the award total available to the player 30 although just the difference between the number of points earned or the accumulated award amounts in the award total and the sum of the redeemed and expired points.

When a "subtract points" transaction occurs, i.e., redeeming or expiring, an audit trail record will be created for the transaction. This record will include information about the transaction (e.g., type and maybe link), the number of points or award amounts the transaction removed and the time stamp of the transaction. The subtract transaction must consume or redeem the oldest points or award totals first. The audit trail of add transactions for the customer should be updated in oldest time stamp first starting with transaction that have consumable points remaining or the award total. The subtract points transactions should update these records in time sequence until the correct number of points is consumed. In doing so, the add transaction audit trail records must have the remaining points (if implemented) and consumed points updated.

The PMP 36 and the computer system 20 expires points or award amounts and an expiring transaction occurs since a point has a monetary value that must be carried on the books. In order to avoid a never ending increasing debt, the award amount will eventually expire. When an "add points" transaction occurs, the time stamp of the transaction and the expiration date of the points will be recorded in the player's audit trail. On a nightly basis, any player 30 showing audit trail records with redeemable points with the expiration date that has been reached will have those points or award amounts expired. This will cause the redeemable points in each award amount to be set to zero and the expired points set to the amount that was expired in those records. On a nightly or weekly basis we may want to do a cross check for each customer to insure that their redeemable points in audit trail records matches their point balance or award total in the player account 34.

The "get points" transaction will return the point balances or award total for the player 30 on the remote device 26. This would include the number of points that may be redeemed, that will expire soon, that were redeemed over the lifetime of the player account 34, and that expired over the lifetime of the player account 34.

The "get audit trail" transaction will return an XML document or a report to the application client that contains the list of add and subtract records in the audit trail for a customer over a UTC time frame. The XML document is viewable on the player interface 50 and part of the reporting of the PMP 36.

Point accumulation is primarily via wagers. Points may also be obtained when purchasing a product or premium service, or an account management function such as deposit, which has point values in the MR assigned to it at the time of purchase. These points are applied to the player account 34 and the award total when the transaction completes. Points accumulated through wagering are earned only after the pool that the wager applies to have become official. Until then the points are pending. A back-end process will be responsible for updating the point balances and award total whenever pools become official for each wager placed on that pool. This will likely be done via a Message Junction application.

Alternatively, the client application knows how many points a wager is worth for each player 30. The wager pathway is modified to pass the point value through the system so that it can be saved in the database with the wager. Then the Message Junction application would only need to traverse these and apply them to the point amount or award amount in the player account 34. This would mean that only client applications would be concerned with point-value computations for wagers.

Conversely, the wager pathway can be left alone and the Message Junction application can make the same calculations that were made by the client application. This, however, will require insurance that the computations are consistent on both ends and will require the Message Junction application to access customer as well as PMP 36 data every time a pool becomes official.

Integration of points into the products will be via XML and transactions made available on the computer system 20. This includes the UCPVM XML document, the MR XML document, and the track classification in the calendar XML document, as well as support for the Point Management transactions as previously described above with add, subtract, and expire transactions.

Award totals and the points accumulated may be used to purchase merchandise. The provider of the merchandise may be a company, such as Cascade Promotion Corporation. A shopping cart interface may be incorporated into the product. The checkout process will produce transactions through the company. These may be real time or batch.

Merchandise that is available may be provided by the promotion company in a fix-format batch file that is typically published nightly. The computer system 20 may process this file nightly into its database and server 24. However, processing of the file is not limited as described and may be processed at any desired time or by any desired entity. The front-end shopping cart offerings will be built dynamically from this data. This may be by accessing the database directly or from an XML document, for display on the player interface 50 upon a redemption request.

Points may be redeemed for wagering dollars, soft products, track partner products or merchandise via integration with Cascade or a catalog server 46. The redemption value per point value may depend upon the source market of the customer. This conversion is factored into the redemption values shown to the customer. Redemption may be available through the player interface 50. It would seem that an order processing component is needed to provide this functionality. Each order type would also have a fulfillment action. A catalog of orders types can then be made available via the computer system 20. The computer system 20 first may assign a currency conversion for the point value as a cash value. The cash value of a point may depend upon the usage class and source market of the customer or other variable associated with each player 30 and the player account 34. The number of points used to purchase an item will be determined by applying the usage class and source market conversion factor to the purchase price of the item. This converted value is shown to the customers as a purchase cost on the player interface 50.

The various order types includes cash, soft products, track partner products, and merchandise. The cash order type converts points or award totals in a player account 34 to a cash value as discussed above may vary depending on market areas and player reward levels. The soft products include two categories, premium products (e.g., Multi-A/V) and information products. This order type is a product purchase based on the determine purchase cost of the soft product. The track partner products include products offered by special track partnerships with the computer system 20 and the PMP 36. This may include a receipt publishing action that includes the redemption certificate for redemption of the track partner product at the racetrack. The Merchandise includes merchandise or special promotions such as trips available from the promotions company, i.e., Cascade Promotions Corporation. Cascade is a partner company that specializes in fulfillment of reward programs. Cascade may be providing the merchandise catalog or the catalog server 46 operatively connected to the computer system 20. Merchandise may consist of hard goods such as televisions or DVD players. It may also consist of vacation or travel packages. It should be appreciated that merchandise is not limited to that which is described here, but may be any type of desired merchandise.

The catalog of available merchandise Cascade may provide a catalog to the computer system 20 on a timeframe set by the computer system 20 and availability with Cascade. The catalog may be inputted into the computer system 20 through a batch file. The catalog may further be changed and updated through communication in a similar manner. The catalog may consist of descriptor records and graphics, and the player interface 50 may use this data to present the catalog to the player 30 or through various other interfaces as are known in the art. Cascade typically processes orders daily. A batch file of all orders processed and their status may be provided nightly once processing is complete. However, the processing is not limited to being processed nightly, but may be processed when desired.

Accounting and reporting will be needed for a number of things. Player 30 services will require an intranet interface or server interface 38 to view customers points balance and audit trail the player account 34 and award totals. The ability to take corrective action will also be needed. This may include the ability to make adjustments, to the player account 34 through the server interface 38.

Obviously, many modifications and variations of the present invention are possible in light of the above teachings.

The invention may be practiced otherwise than as specifically described within the scope of the appended claims.

What is claimed is:

1. A method for rewarding a player for activity related to a plurality of racetrack events through a computer system, the racetrack events occurring at different locations, said method comprising the steps of:
    creating a player account for the player, the player account including an award total, player identification and a usage class associated with the player;
    displaying a player interface for the player on a remote device connected to the computer system, the remote device being remote from the different locations;
    identifying the player at the remote device through the player interface;
    storing information on the racetrack events on the computer system including a location of the racetrack event;
    allowing the player to place a wager on the racetrack event on a request by the player on the remote device;
    storing wager information on the computer system, the wager information including the wager and past wagers on the computer system;
    establishing a base reward level as a function of the location of the racetrack event;
    establishing a usage reward level as a function of the usage class associated with the player;
    determining an award amount as a function of the wager, the base reward level, and the usage reward level, the award amount being independent of an outcome of the racetrack event; and
    adding the award amount to the award total in the player account.

2. A method as set forth in claim 1 further comprising a step of logging in the player account player activity by the player on the remote device, the player activity including the wagers and/or usage amount on the remote device and/or products or services purchased.

3. A method as set forth in claim 2 further comprising a step of determining the base reward level as a function of the racetrack event.

4. A method as set forth in claim 2 further comprising of calculating the base reward level as a function of a market base of the racetrack event, a racetrack contract and/or a wager category of the racetrack event.

5. A method as set forth in claim 2 further comprising a step of determining the usage reward level as a function of the player activity logged in the player account compared to the set of predetermined criteria.

6. A method as set forth in claim 2 further comprising a step of programming on the computer system the market base, the racetrack contract, and the wager category for determining the base reward level for the racetrack event.

7. A method as set forth in claim 2 further comprising a step of establishing a time and/or event to determine the reward level for the player.

8. A method as set forth in claim 1 further comprising a step of allowing the player to redeem all or a portion of the award total in the player account for a product, a cash value, or a service on a request by the player on the remote device.

9. A method as set forth in claim 8 further comprising a step of connecting a catalog server to the computer system for updating the products and services for redeeming the award total in the player account.

10. A method as set forth in claim 1 further comprising a step of managing the player account by expiring the award amount after a set duration.

11. A method as set forth in claim 1 further comprising a step of creating an audit trail including all the award amounts, expired amounts and redeemed amounts from the player account.

12. A system for rewarding a player for activity related to a plurality of racetrack events through a computer system, the racetrack events occurring at different locations, said system comprising:
    a remote device for displaying a player interface to the player, the remote device being remote from the different locations; and
    a computer system operatively connected to said remote device for creating a player account for the player, the player account includes an award total, player identification and a usage class associated with the player, for storing information on the racetrack events on the computer system including a location of the racetrack events, for identifying the player at the remote device through the player interface and allowing the player to place a wager on the racetrack event and storing wager information on said computer system, the wager information includes the wager and past wagers on the computer system, for establishing a base reward level as a function of the location of the racetrack event and establishing a usage reward level as a function of the usage class associated with the player, and for determining an award amount as a function of the wager, the base reward level and the ease reward level and adding the award amount to the award total in the player account, the award amount being independent of an outcome of the racetrack event.

13. A system as set forth in claim 12 further comprising a server interface for use by a user for establishing a market base of the racetrack event, a racetrack contract of the racetrack event, and a wager category of the racetrack event for determining the reward level of the player and the award amount based on the player wager and player activity by the player at the remote device, and for managing the player account.

14. A system as set forth in claim 12 further comprising a catalog server operatively connected to the computer system for updating product and/or services available to the player for redeeming the award total in the player account.

15. A method for rewarding a player for activity related to a plurality of racetrack events through a computer system, said method comprising the steps of:
    creating a player account for the player, the player account including an award total, a player identification, and a usage class associated with the player;
    displaying a player interface for the player on a remote device connected to the computer system, the remote device being remote from the different locations;
    identifying the player at the remote device through the player interface;
    allowing the player to place a wager on the racetrack event at the remote device;
    storing in the player account player activity by the player on the remote device, the player activity including the wager and past wagers and usage amount on the remote device and products or services purchased;
    establishing a base reward level as a function of the location of the racetrack event;
    establishing a usage reward level as a function of the usage class associated with the players;

determining an award amount as a function of the wager, the base reward level and the usage reward level, the award amount being independent of an outcome of the racetrack event;

adding the award amount to the award total in the player account;

allowing the player to redeem redeeming all or a portion of the award total in the player account for a product, a cash value or a service on a request by the player at the remote device; and managing the player account by expiring the award amount after a set duration.

16. A method as set forth in claim 15 further comprising of calculating the base reward level as a function of the racetrack event, the function including a market base, a racetrack contract and/or a wager category.

17. A method as set forth in claim 15 further determining the usage reward level as a function of the player activity in the player account compared to a set of predetermined criteria.

* * * * *